(12) United States Patent
Kim et al.

(10) Patent No.: US 11,031,635 B2
(45) Date of Patent: Jun. 8, 2021

(54) BATTERY PACK

(71) Applicant: LG CHEM, LTD., Seoul (KR)

(72) Inventors: Hak-In Kim, Daejeon (KR);
Dong-Hyun Kim, Daejeon (KR);
Ho-Chol Nam, Daejeon (KR)

(*) Notice: Subject to any disclaimer, the term of this patent is extended or adjusted under 35 U.S.C. 154(b) by 33 days.

(21) Appl. No.: 16/493,586

(22) PCT Filed: Oct. 24, 2018

(86) PCT No.: PCT/KR2018/012665
§ 371 (c)(1),
(2) Date: Sep. 12, 2019

(87) PCT Pub. No.: WO2019/088558
PCT Pub. Date: May 9, 2019

(65) Prior Publication Data
US 2020/0144678 A1   May 7, 2020

(30) Foreign Application Priority Data

Oct. 31, 2017 (KR) .......................... 10-2017-0143552

(51) Int. Cl.
*H01M 10/42* (2006.01)
*H02J 7/00* (2006.01)
(Continued)

(52) U.S. Cl.
CPC ....... *H01M 10/425* (2013.01); *H01M 50/502* (2021.01); *H01M 50/543* (2021.01);
(Continued)

(58) Field of Classification Search
None
See application file for complete search history.

(56) References Cited

U.S. PATENT DOCUMENTS

2012/0181987 A1* 7/2012 Lee ................. H02J 7/0029
320/128
2012/0286575 A1  11/2012 Park et al.
(Continued)

FOREIGN PATENT DOCUMENTS

JP   H09-199183 A    7/1997
JP   2011-109768 A   6/2011
(Continued)

OTHER PUBLICATIONS

International Search Report for PCT/KR2018/012665 (PCT/ISA/210) dated Feb. 19, 2019, with English translation.

*Primary Examiner* — Daniel S Gatewood
(74) *Attorney, Agent, or Firm* — Birch, Stewart, Kolasch & Birch, LLP

(57) ABSTRACT

A battery pack, which includes: a battery module having a positive electrode terminal and a negative electrode terminal; a first power connector having a first power terminal connected to the positive electrode terminal, a second power terminal connected to the negative electrode terminal and a first auxiliary terminal, the first power connector being configured to be coupled to or separated from a second power connector that is included in an external device; a control unit to determine whether the first power connector and the second power connector are coupled; a first communication connector to input or output a communication signal between the external device and the control unit; and a communication switching unit installed between the control unit and the first communication connector, the control unit turns on or off the communication switching unit in response to the determination result.

8 Claims, 4 Drawing Sheets

(51) Int. Cl.
  *H01M 50/502* (2021.01)
  *H01M 50/543* (2021.01)
  *H01M 50/572* (2021.01)
(52) U.S. Cl.
  CPC ....... *H01M 50/572* (2021.01); *H02J 7/00032* (2020.01); *H01M 2010/4271* (2013.01); *H01M 2010/4278* (2013.01)

(56) References Cited

U.S. PATENT DOCUMENTS

| | | |
|---|---|---|
| 2015/0088354 A1 | 3/2015 | Kanayama |
| 2015/0097525 A1 | 4/2015 | Dedona et al. |
| 2016/0156201 A1 | 6/2016 | Park |
| 2016/0156204 A1 | 6/2016 | Kim et al. |
| 2017/0010659 A1* | 1/2017 | Park .................. G06F 13/14 |
| 2017/0149096 A1 | 5/2017 | Shiraishi et al. |
| 2018/0342885 A1 | 11/2018 | Hong |

FOREIGN PATENT DOCUMENTS

| | | | | |
|---|---|---|---|---|
| JP | 2013-230037 A | 11/2013 | | |
| JP | 2014-202488 A | 10/2014 | | |
| JP | 2015-84634 A | 4/2015 | | |
| JP | 2017-009125 A2 | 1/2017 | | |
| JP | 2017-41983 A | 2/2017 | | |
| JP | 2017-99125 A | 6/2017 | | |
| JP | 2018-064357 A2 | 4/2018 | | |
| KR | 10-2012-0015895 A | 2/2012 | | |
| KR | 10-2012-0083023 A | 7/2012 | | |
| KR | 20120083023 A | * 7/2012 | ............ | H02J 7/0029 |
| KR | 10-2013-0032165 A | 4/2013 | | |
| KR | 10-2015-0108589 A | 9/2015 | | |
| KR | 20150108589 A | * 9/2015 | ............ | G06F 1/3287 |
| KR | 10-2016-0063758 A | 6/2016 | | |
| KR | 10-2016-0066301 A | 6/2016 | | |
| KR | 10-2017-0002298 A | 1/2017 | | |
| KR | 10-2017-0072589 A | 6/2017 | | |

* cited by examiner

BATTERY PACK

TECHNICAL FIELD

The present application claims priority to Korean Patent Application No. 10-2017-0143552 filed on Oct. 31, 2017 in the Republic of Korea, the disclosures of which are incorporated herein by reference.

The present disclosure relates to a battery pack, and more particularly, to a battery pack for controlling the connection between a communication connector and a control unit by using a voltage distribution principle.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries commercially available at present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

A battery pack may be detachably coupled to a body of a wireless device such as a wireless cleaner. To increase the output electric power of the wireless device, a battery pack capable of providing a high output voltage should be used. For charge and discharge of the battery pack, a charge/discharge switch should be installed at a high side or a low side of the battery pack. If the charge/discharge switch is installed at the high side of the battery pack, a charge pump and a gate driver are required, which causes the increase of cost, compared to the case where the charge/discharge switch is installed at the low side of the battery pack. Accordingly, if the output voltage of the battery pack is high, the charge/discharge switch is installed at the low side of the battery pack.

If a short circuit occurs between a power terminal connected to the high side and a communication terminal connected to an internal control unit for communication with the wireless device while the battery pack having the charge/discharge switch at the low side is being attached to or detached from the wireless device, a high voltage is applied to the high side, the power terminal and the communication terminal in order and thus flows to the control unit, thereby damaging the control unit.

DISCLOSURE

Technical Problem

The present disclosure is designed to solve the problems of the related art, and therefore the present disclosure is directed to providing a battery pack, which may detect the coupling with an external device by using a voltage distribution principle and control a communication switch unit located between a control unit and a communication terminal in response to the detection result.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

Various embodiments of the present disclosure to accomplish the above objects are as follows.

In one aspect of the present disclosure, there is provided a battery pack, comprising: a battery module having a positive electrode terminal and a negative electrode terminal; a first power connector having a first power terminal connected to the positive electrode terminal, a second power terminal connected to the negative electrode terminal and a first auxiliary terminal, the first power connector being configured to be coupled to or separated from a second power connector that is included in an external device; a control unit configured to judge determine whether the first power connector and the second power connector are coupled; a first communication connector configured to input or output a communication signal between the external device and the control unit; and a communication switching unit installed between the control unit and the first communication connector.

According to an embodiment, the control unit may turn on or off the communication switching unit in response to the determination result.

According to an embodiment, the battery pack may further comprise a first resistor element having a first end electrically connected to a ground and a second end electrically connected to the first auxiliary terminal.

According to an embodiment, the control unit may include a sub-control module configured to determine that the first power connector and the second power connector are coupled when a voltage of the first resistor element is within in a threshold range, and then supply an operation power; and a main control module configured to shift from a sleep state to a wake-up state when the operation power is supplied from the sub-control module.

According to an embodiment, the main control module may turn on the communication switching unit when operating in the wake-up state.

According to another embodiment, when the voltage of the first resistor element deviates from the threshold range while the main control module is operating in the wake-up state, the main control module may determine that the first power connector and the second power connector are separated, and shift from the wake-up state to the sleep state.

According to another embodiment, the main control module may turn off the communication switching unit when operating in the sleep state.

According to an embodiment, when the voltage of the first resistor element deviates from the threshold range while the main control module is operating in the wake-up state, the main control module may determine that the first power connector and the second power connector are separated, and send a first shut-down command to the sub-control module.

According to an embodiment, the sub-control module may stop the supply of the operation power to the main control module in response to the first shut-down command from the main control module.

According to still another embodiment, when the voltage of the first resistor element deviates from the threshold range while the main control module is operating in the wake-up state, the sub-control module may determine that the first power connector and the second power connector are separated, and send a second shut-down command to the main control module.

According to still another embodiment, the main control module may shift from the wake-up state to the sleep state in response to the second shut-down command from the sub-control module.

According to still another embodiment, when the voltage of the first resistor element deviates from the threshold range while the main control module is operating in the wake-up state, the sub-control module may determine that the first power connector and the second power connector are separated, and stop the supply of the operation power to the main control module.

Advantageous Effects

According to at least one of the embodiments of the present disclosure, it is possible to detect the coupling with an external device by means of the voltage distribution principle and control the communication switch unit located between the control unit and the communication terminal in response to the detection result.

Also, according to at least one of the embodiments of the present disclosure, if it is detected that the external device is separated, the communication switch unit located between the control unit and the communication terminal is turned off, and thus it is possible to prevent a high voltage from being applied to the control unit even when the power terminal of the battery pack and the communication terminal are connected unintentionally due to any conductor.

The effects of the present disclosure are not limited to the above, and other effects not mentioned herein may be clearly understood by those skilled in the art from the appended claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise. Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, the device according to an embodiment of the present disclosure will be described.

Figure 1:
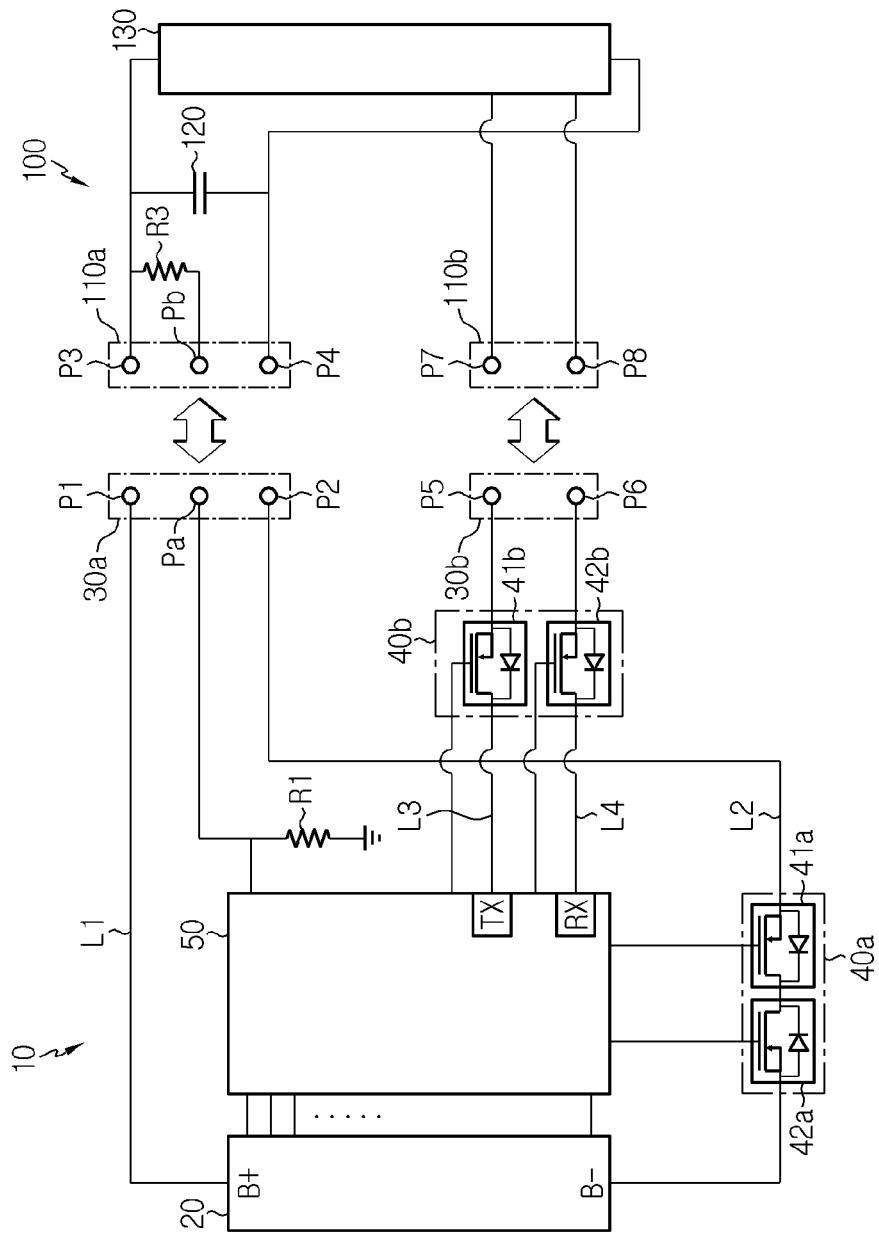
FIGS. 1 to 3 are diagrams showing functional configurations of a battery pack according to embodiments of the present disclosure and an external device.
Figure 2:
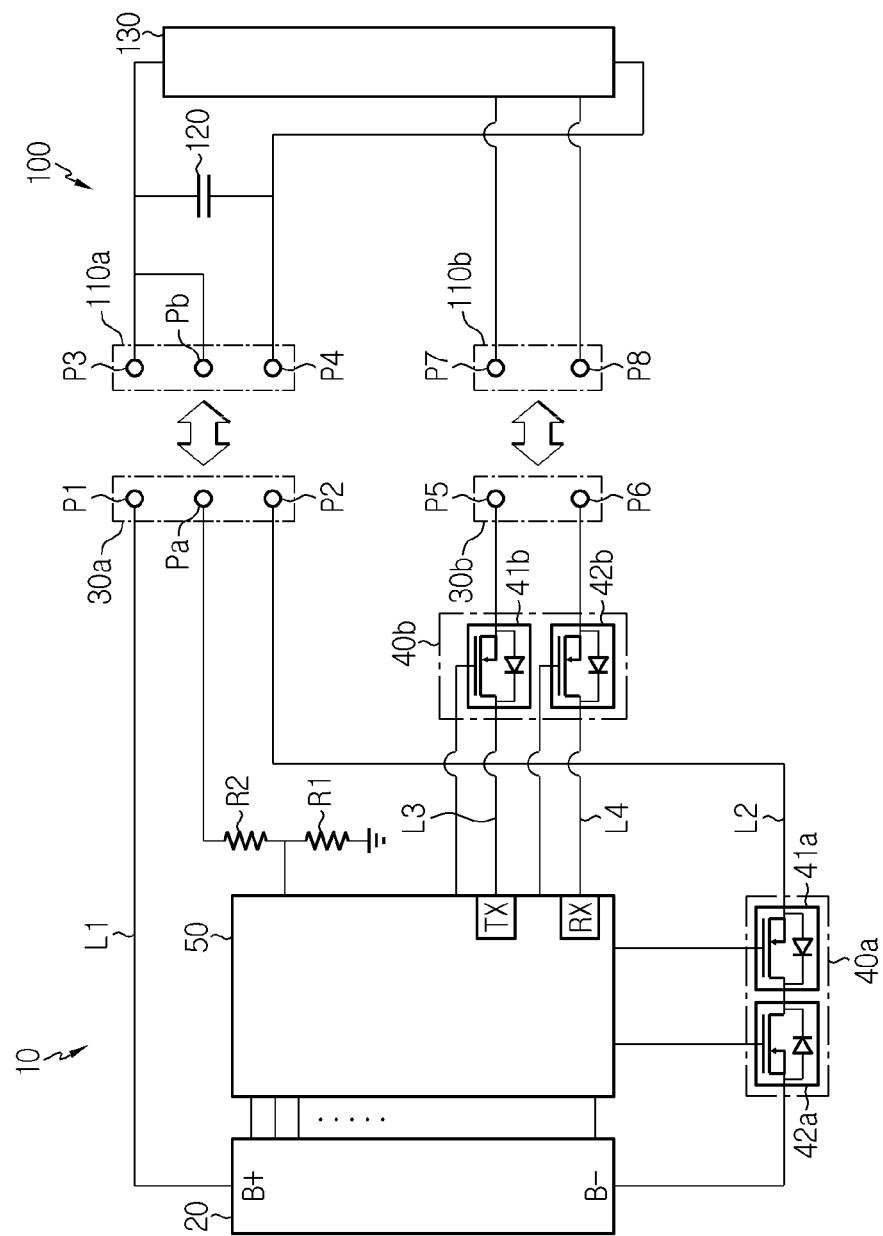
Figure 3:
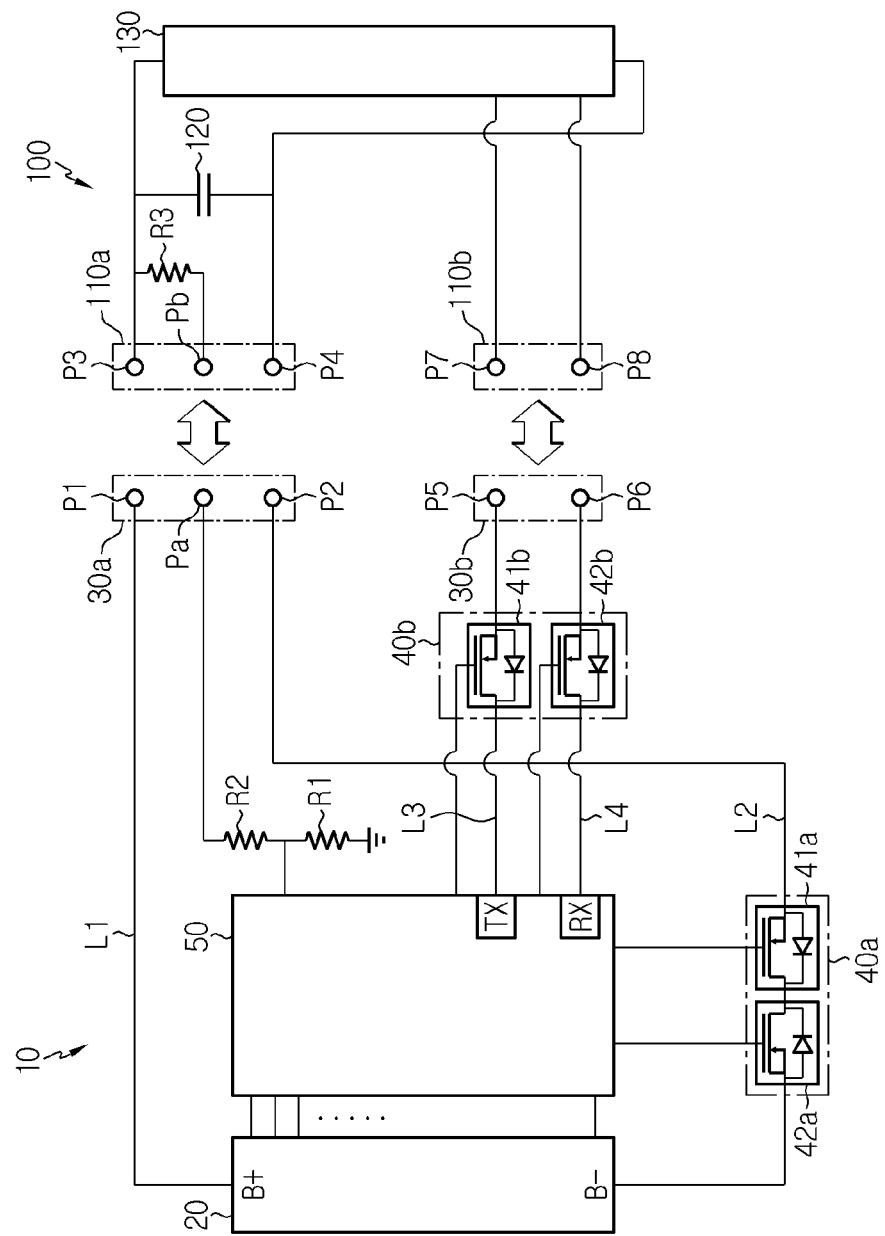

FIGS. 1 to 3 are diagrams showing functional configurations of a battery pack 10 according to embodiments of the present disclosure and an external device 100.

First, referring to FIG. 1, the battery pack 10 includes a battery module 20, a first power connector 30a, a first communication connector 30b, a resistor element R1, a power switching unit 40a, a communication switching unit 40b and a control unit 50.

The battery module 20 may include at least one battery cell. If the battery module 20 includes a plurality of battery cells electrically connected, the plurality of battery cells may be connected to each other in series, in parallel or in series and parallel. The battery module 20 has a positive electrode terminal B+ and a negative electrode terminal B−. The positive electrode terminal B+ of the battery module 20 is electrically connected to a first power connector 30a through a first power line L1. The negative electrode terminal B− of the battery module 20 is electrically connected to the first power connector 30a through a second power line L2. A high side of the battery pack 10 may mean a portion between the positive electrode terminal B+ of the battery module 20 and the first power connector 30a, which are connected through the first power line L1. A low side of the battery pack 10 may mean a portion between the negative electrode terminal B− of the battery module 20 and the first power connector 30a, which are connected through the second power line L2.

The first power connector 30a includes a first power terminal P1, a second power terminal P2 and a first auxiliary terminal Pa. The first power terminal P1 is connected to the positive electrode terminal B+ of the battery module 20 through the first power line L1. The second power terminal P2 is connected to the negative electrode terminal B− of the battery module 20 through the second power line L2. The first auxiliary terminal Pa is connected to a resistor element R1, explained later. The first power connector 30a may be configured such that at least a portion of the first power terminal P1, the second power terminal P2 and the first auxiliary terminal Pa is exposed to be observed by naked eyes from the outside, and may be configured to be physically coupled to or detached from a second power connector 110a included in the external device 100.

By doing so, the electric power stored in the battery module 20 is supplied to an external device 100, or the battery module 20 is charged with an external electric power.

The resistor element R1 has a first end and a second end. The resistor element R1 is one of two or more resistor elements used to divide the voltage of the battery pack 10 (hereinafter, referred to as a 'pack voltage') applied between the first power terminal P1 and the second power terminal P2. The first end of the resistor element R1 is electrically connected to the ground. The second end of the resistor element R1 is electrically connected to the first auxiliary terminal Pa.

The first communication connector 30b includes a first communication terminal P5 and a second communication terminal P6. The first communication terminal P5 is connected to a sending terminal Tx of the control unit 50, explained later, through a first communication line L3. The second communication terminal P6 is connected to a receiving terminal Rx of the control unit 50, explained later, through a second communication line L4. The first communication connector 30b may be configured such that at least a portion of the first communication terminal P5 and the second communication terminal P6 is exposed to be observed by naked eyes from the outside, and may be physically coupled to or detached from a second communication connector 110b included in the external device 100. By doing so, the first communication connector 30b may input or output a communication signal sent or received between the external device 100 and the control unit 50.

The power switching unit 40a is installed between the negative electrode terminal B− of the battery module 20 and the second power terminal P2. That is, the power switching unit 40a is installed on the second power line L2 corresponding to the low side of the battery pack 10. The power switching unit 40a includes a charge switch 41a and a discharge switch 42a connected to each other in series. The charge switch 41a and the discharge switch 42a may include a field effect transistor (FET) and a parasitic diode connected to each other in parallel, respectively. Each FET includes a drain, a source and a gate. The gate of each FET may be connected to the control unit 50 to receive a switching signal from the control unit 50, explained later.

The drain and the source of the FET of the charge switch 41a may be connected to give a charge current path. Conversely, the drain and the source of the FET of the discharge switch 42a may be connected to give a discharge current path.

The parasitic diode of the charge switch 41a may be connected in a discharge current direction, and the parasitic diode of the discharge switch 42a may be connected in a charge current direction. Accordingly, if the FET of the charge switch 41a is in a turn-off state, only the discharge current path through the parasitic diode of the charge switch 41a may be provided. Also, if the FET of the discharge switch 42a is in the turn-off state, only the charge current path through the parasitic diode of the discharge switch 42a may be provided.

The communication switching unit 40b is installed between the control unit 50 and the first communication connector 30b. Specifically, the communication switching unit 40b includes a sending switch 41b installed between the sending terminal Tx of the control unit 50 and the first communication terminal P5 of the first communication connector 30b, and a receiving switch 42b installed between the receiving terminal Rx of the control unit 50 and the second communication terminal P6 of the first communication connector 30b. The sending switch 41b and the receiving switch 42b may include a field effect transistor (FET) and a parasitic diode connected to each other in parallel, respectively. Each FET includes a drain, a source and a gate. The gate of each FET may be connected to the control unit 50 to receive a switching signal from the control unit 50, explained later.

The drain and the source of the FET of the sending switch 41b may be connected to give a path for transmitting the communication signal sent from the sending terminal Tx of the control unit 50 to the first communication terminal P5 of the first communication connector 30b. Conversely, the drain and the source of the FET of the receiving, switch 42b may be connected to give a path for transmitting the communication signal received from the second communication terminal P6 to the receiving terminal Rx of the control unit 50.

The control unit 50 is electrically connected to the battery module 20, the first power connector 30a, the resistor element R1, the power switching unit 40a and the communication switching unit 40b. The control unit 50 determines whether or not the first power connector 30a and the second power connector 110a of the external device 100 are coupled, and operates in a wake-up state to turn on the communication switching unit 40b or operates in a sleep state to turn off the communication switching unit 40b in response to the determination result.

More specifically, the control unit 50 detects a voltage of the resistor element R namely a voltage (hereinafter, referred to as a 'distribution voltage') applied between the first end and the second end of the resistor element R1, and operates in any one of the wake-up state and the sleep state according to the detected distribution voltage. That is, the control unit 50 is configured to always operate in the sleep state when the battery pack 10 is separated from the external device 100, and to shift from the sleep state to the wake-up state when the battery pack 10 is coupled to the external device 100.

In the sleep state, the control unit 50 turns off the communication switching unit 40b to keep the sending switch 41b and the receiving switch 42b included in the communication switching unit 40b in the turn-off state. By doing so, the control unit 50 may prevent that the first power terminal P1 of the first power connector 30a is electrically connected to the sending switch 41b and the receiving switch 42b so that a high voltage of the battery module 20 applied to the first power terminal P1 is introduced into the control unit 50.

In the wake-up state, the control unit 50 turns on the communication switching unit 40b to keep the sending switch 41b and the receiving switch 42b included in the communication switching unit 40b in the turn-on state. By doing so, the control unit 50 may communicate with the external device 100 while operating in the wake-up state.

Meanwhile, in the sleep state, the control unit 50 keeps the charge switch 41a and the discharge switch 42a in the turn-off state. That is, the control unit 50 may stop the output of the switching signal for each of the charge switch 41a and the discharge switch 42a while operating in the sleep state.

In the wake-up state, the control unit 50 may shift at least one of the charge switch 41a and the discharge switch 42a to the turn-on state according to the communication with the external device 100. More detailed configuration of the control unit 50 will be described later with reference to FIGS. 4 and 5.

The external device 100 may be a charger or an electric load (e.g., a motor drive of a vacuum cleaner). Hereinafter, for the sake of understanding, the electric load will be referred to as a 'wireless device body'. The battery pack 10 may be detachably coupled to the external device 100. In addition, the battery pack 10 may be included in the wireless device body.

The external device 100 includes a second power connector 110a, a second communication connector 110b and a resistor element R3, and may optionally further include a protection capacitor 120. If the external device 100 is a vacuum cleaner, the external device 100 may further include a driving circuit 130 and the like.

The second power connector 110a includes a third power terminal P3, a fourth power terminal P4 and a second auxiliary terminal Pb. and may be physically coupled to or separated from the first power connector 30a. If the first power connector 30a and the second power connector 110a are physically coupled to each other, the third power terminal P3 may be electrically connected to the first power terminal P1, the fourth power terminal P4 may be electrically connected to the second power terminal P2, and the second auxiliary terminal Pb may be electrically connected to the first auxiliary terminal Pa.

The resistor element R3 has a first end and a second end. The resistor element R3 is electrically connected between the third power terminal P3 and the second auxiliary terminal Pb. Specifically, the first end of the resistor element R3 is electrically connected to the second auxiliary terminal Pb, and the second end of the resistor element R3 is electrically connected to the third power terminal P3. Accordingly, when the first power connector 30a and the second power connector 110a are physically coupled to each other, the resistor element R1 and the resistor element R3 are electrically connected to each other in series to operate as a voltage distributor. That is, the voltage between the third power terminal P3 and the ground may be divided by the resistor element R1 and the resistor element R3.

The protection capacitor 120 has a first end and a second end. The protection capacitor 120 may be electrically connected between the third power terminal P3 and the fourth power terminal P4. Specifically, the first end of the protection capacitor 120 may be electrically connected to the fourth power terminal P4, and the second end of the protection capacitor 120 may be electrically connected to the third power terminal P3. The protection capacitor 120 plays a role of suppressing an abrupt change of the voltage applied between the third power terminal P3 and the fourth power terminal P4 due to the physical coupling between the first power connector 30a and the second power connector 110a.

The second communication connector 110b includes a third communication terminal P7 and a fourth communication terminal P8, and may be physically coupled to or separated from the first communication connector 30b. When the first communication connector 30b and the second communication connector 110b are physically coupled to each other, the third communication terminal P7 may be electrically connected to the first communication terminal P5 and the fourth communication terminal P8 may be electrically connected to the second communication terminal P6.

By doing so, the communication signal sent from the control unit 50 is input to the third communication terminal P7 of the second communication connector 110b and is received by the driving circuit 130. Also, the communication signal sent from the driving circuit 130 is output from the fourth communication terminal P8 of the second communication connector 110b and is received by the control unit 50.

Next, referring to FIG. 2, compared to FIG. 1, the battery pack 10 further includes a resistor element R2, and the resistor element R3 of the external device 100 is excluded, different from FIG. 1. In this case, the third power terminal P3 of the second power connector 110a and the second auxiliary terminal Pb may be electrically connected to each other directly or via a conductor. When the first power connector 30a and the second power connector 110a are physically coupled to each other, the resistor element R1 and the resistor element R2 are electrically connected in series to operate as a voltage distributor.

Next, referring to FIG. 3, the battery pack 10 includes the resistor element R2 and the external device 100 includes the resistor element R3, different from FIGS. 1 and 2. When the first power connector 30a and the second power connector 110a are physically coupled to each other, the resistor element R1, the resistor element R2 and the resistor element R3 are electrically connected to each other in series to operate as a voltage distributor.

Figure 4:
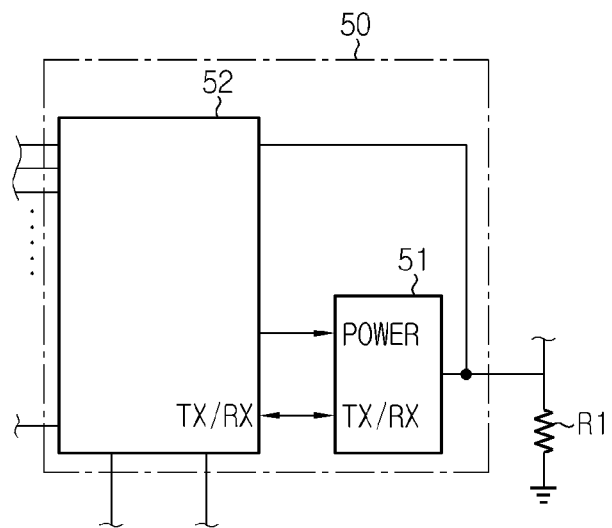
FIGS. 4 and 5 are diagrams showing a detailed configuration of the control unit depicted in FIGS. 1 to 3.
Figure 5:
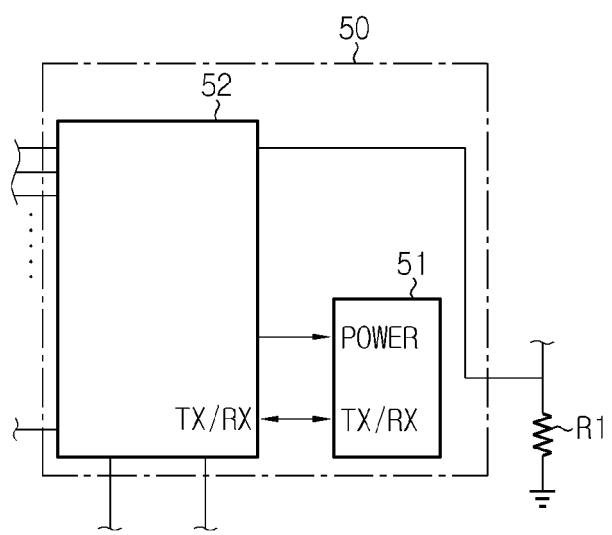

FIGS. 4 and 5 are diagrams showing a detailed configuration of the control unit 50 depicted in FIGS. 1 to 3.

First, referring to FIG. 4, the control unit 50 includes a main control module 51 and a sub-control module 52. The main control module 51 and the sub-control module 52 are electrically connected in common to the second end of the resistor element R1 to detect the voltage of the resistor element R1 independently.

The sub-control module 52 is configured to measure the voltage of the battery module 20 and send a voltage signal indicating the measured module voltage to the main control module 51. Here, the module voltage may mean a voltage between the positive electrode terminal B+ and the negative electrode terminal B− of the battery module 20 or a voltage of each battery cell. For the sake of convenience, the sub-control module 52 may be referred to as an 'analog front end'.

The main control module 51 is operably coupled to the sub-control module 52. The main control module 51 may selectively include a processor, an application-specific integrated circuit (ASIC), another chipset, a logic circuit, a register, a communication modem, a data processing device or the like in order to execute various control logics. At least one of the various control logics executable by the main control module 51 may be combined, and the combined control logic is written in a computer-readable code system and recorded on a computer-readable recording medium. The recording medium has no limitation as long as it can be accessed by the processor included in a computer. As one example, the recording medium includes at least one selected from the group consisting of a ROM, a RAM, a register, a CD-ROM, a magnetic tape, a hard disk, a floppy disk and an optical data recording device.

The main control module 51 is configured to generate a switching signal for shifting at least one of the charge switch 41a, the discharge switch 42a, the sending switch 41b and the receiving switch 42b to the turn-on state, based on the voltage signal from the sub-control module 52 or the command from the external device 100.

Specifically, if the first power connector 30a is electrically disconnected from the second power connector 110a, the voltage of the resistor element R1 is 0V, and thus the control unit 50 operates in the sleep state. If the first power terminal P1 and the first auxiliary terminal Pa of the first power connector 30a are electrically connected by the second power connector 110a or any conductor at any time point, the voltage of the resistor element R1 will increase over 0V.

The sub-control module 52 may determine whether the voltage of the resistor element R1 is included in a predetermined threshold range by periodically or non-periodically detecting the voltage of the resistor element R1 repeatedly. It will be apparent to those skilled in the art that the threshold ranges for the embodiments shown in FIGS. 1 to 3 may be equal to or different from each other but the lower limit of all threshold ranges is greater than 0V. Since each resistor element included in the voltage distributor described above with reference to FIGS. 1 to 3 has a predetermined resistance, the voltage of the resistor element R1 is included in the threshold range only when the first power connector 30a is coupled to the second power connector 110a, and the voltage of resistor element R1 will deviate from the threshold range if the first power connector 30a is coupled to any conductor.

If the voltage of the resistor element R1 is included in the threshold range, the sub-control module 52 may determine that the first power connector 30a and the second power connector 110a are coupled, and supply an operation voltage (for example, 3.3V) to the main control module 51 by using the power supply circuit included therein. The main control module 51 may operate in the sleep state and shift from the sleep state to the wake-up state if the operation voltage is supplied from the sub-control module 52. In the wake-up state, the main control module 51 may turn on the sending switch 41b and the receiving switch 42b of the communication switching unit 40b to electrically connect the first communication connector 30b and the main control module 51 included in the control unit 50.

In addition, the main control module 51 may charge or discharge the battery module 20 by controlling the power switching unit 40a.

When the main control module 51 is operating in the wake-up state by the operation voltage, if the first power terminal P1 is separated from the third power terminal P3 or the first auxiliary terminal Pa is separated from the second auxiliary terminal Pb, the process of charging or discharging the battery pack 10 by the external device 100 is stopped, and thus the voltage of the resistor element R1 decreases to 0V and deviates from the threshold range. In this case, the main control module 51 according to an embodiment may determine that the first power connector 30a and the second power connector 110a are separated, and transmit a first shut-down command to the sub-control module 52.

The sub-control module 52 stops the supply of the operation power to the main control module 51 in response to the first shut-down command from the main control module 51. Accordingly, the main control module 51 shifts from the wake-up state to the sleep state again.

If shifting from the wake-up state to the sleep state, the main control module 51 according to an embodiment may cut the electrical connection between the first communication connector 30b and the main control module 51 included in the control unit 50 by turning off the sending switch 41b and the receiving switch 42b of the communication switching unit 40b.

Meanwhile, the sub-control module 52 according to another embodiment may send a second shut-down command to the main control module 51 in response to the first shut-down command from the main control module 51, before stopping the supply of the operation power to the main control module 51.

The main control module 51 according to another embodiment may cut the electrical connection between the first communication connector 30b and the main control module 51 included in the control unit 50 by turning off the sending switch 41b and the receiving switch 42b of the communication switching unit 40b before shifting from the wake-up state to the sleep state in response to the second shut-down command.

Meanwhile, in another embodiment, if the voltage of the resistor element R1 deviates from the threshold range while the main control module 51 is operating in the wake-up state, the main control module 51 determines that the first power connector 30a and the second power connector 110a are separated, and shifts from the wake-up state to the sleep state by itself without sending the first shut-down command to the sub-control module 52, unlike the main control module 51 according to the former embodiment.

If the main control module 51 shifts from the wake-up state to the sleep state, the main control module 51 according to another embodiment may cut the electrical connection between the first communication connector 30b and the main control module 51 included in the control unit 50 by turning off the sending switch 41b and the receiving switch 42b of the communication switching unit 40b.

Next, referring to FIG. 5, the second end of the resistor element R1 may be electrically connected only to the sub-control module 52 among the sub-control module 52 and the main control module 51, unlike FIG. 4. That is, the electrical connection between the second end of the resistor element R1 and the main control module 51 may be omitted. In this case, the process of shifting from the sleep state to the wake-up state is identical to the former embodiment illustrated in FIG. 4, but the process of shifting from the wake-up state to the sleep state again is different from FIG. 4. Specifically, the sub-control module 52 monitors the voltage of the resistor element R1 while the main control module 51 is operating in the wake-up state, and if the voltage of the resistor element R1 deviates from the threshold range, the sub-control module 52 determines that the first power connector 30a and the second power the connector 110a are separated, and stops the supply of the operation voltage to the main control module 51 even though there is no first shut-down command from the main control module 51. Accordingly, the main control module 51 operates in the sleep state or in the wake-up state depending on whether the operation voltage is supplied from the sub-control module 52 without directly monitoring the voltage of the resistor element R1.

Meanwhile, the control unit 50 depicted in FIG. 1 or 3 may determine whether the external device 100 is a charger or a wireless device body, depending on the voltage of the resistor element R1. Specifically, if the resistance of the resistor element R3 included in the charger is set to be different from the resistance of the resistor element R3 included in the wireless device body, the voltage of the resistor element R1 when the charger is coupled to the battery pack 10 is different from the voltage of the resistor element R1 when the wireless device body is coupled to the battery pack 10. Thus, if the voltage of the resistor element R1 has a value between a first value and a second value in the threshold range, the control unit 50 may determine that the battery pack 10 is coupled to the charger and thus control the FET of the charge switch 41a to the turn-on state and control the FET of the discharge switch 42a to the turn-off state. Meanwhile, if the voltage of the resistor element R1 has a value between a third value and a fourth value in the threshold range, the control unit 50 may determine that the battery pack 10 is coupled to the wireless device body and thus control the FET of the charge switch 41*a* to the turn-off state and control the FET of the discharge switch 42*a* to the turn-on state.

The embodiments of the present disclosure described above are not necessarily implemented by apparatuses and methods but may also be implemented through a program for realizing functions corresponding to the configuration of the present disclosure or a recording medium on which the program is recorded. Such implementation may be easily performed by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A battery pack, comprising:
   a battery module having a positive electrode terminal and a negative electrode terminal;
   a first power connector having a first power terminal connected to the positive electrode terminal, a second power terminal connected to the negative electrode terminal and a first auxiliary terminal, the first power connector being configured to be coupled to or separated from a second power connector that is included in an external device to receive an electric power of the battery module;
   a control unit configured to determine whether the first power connector is connected to the second power connector;
   a power switching unit provided between the negative electrode terminal of the battery module and the second power terminal of the first power connector, the power switching unit including a charge switch connected in series to a discharge switch;
   a first communication connector configured to input or output a communication signal between the external device and the control unit and including a first communication terminal and a second communication terminal; and
   a communication switching unit installed between the control unit and the first communication connector, the communication switching unit including:
      a sending switch installed between a sending terminal of the control unit and the first communication terminal of the first communication connector; and
      a receiving switch installed between a receiving terminal of the control unit and the second communication terminal of the first communication connector,
   wherein the control unit turns on or off the communication switching unit in response to determining the first power connector is connected to the second power connector.

2. The battery pack according to claim 1, further comprising:
   a first resistor element having a first end electrically connected to a ground and a second end electrically connected to the first auxiliary terminal,
   wherein the control unit includes:
   a sub-control module configured to determine that the first power connector is connected to the second power connector when a voltage of the first resistor element is within in a threshold range, and then supply an operation power; and
   a main control module configured to shift from a sleep state to a wake-up state when the operation power is supplied from the sub-control module.

3. The battery pack according to claim 2,
   wherein the main control module turns on the communication switching unit when operating in the wake-up state.

4. The battery pack according to claim 2,
   wherein when the voltage of the first resistor element deviates from the threshold range while the main control module is operating in the wake-up state, the main control module determines that the first power connector is disconnected from the second power connector, and shifts from the wake-up state to the sleep state.

5. The battery pack according to claim 2,
   wherein the main control module turns off the communication switching unit when operating in the sleep state.

6. The battery pack according to claim 2,
   wherein when the voltage of the first resistor element deviates from the threshold range while the main control module is operating in the wake-up state, the main control module determines that the first power connector is disconnected from the second power connector, and sends a first show-down command to the sub-control module, and
   wherein the sub-control module stops the supply of the operation power to the main control module in response to the first show-down command from the main control module.

7. The battery pack according to claim 2,
   wherein when the voltage of the first resistor element deviates from the threshold range while the main control module is operating in the wake-up state, the sub-control module determines that the first power connector is disconnected from the second power connector, and sends a second show-down command to the main control module, and
   wherein the main control module shifts from the wake-up state to the sleep state in response to the second show-down command from the sub-control module.

8. The battery pack according to claim 2,
   wherein when the voltage of the first resistor element deviates from the threshold range while the main control module is operating in the wake-up state, the sub-control module determines that the first power connector is disconnected from the second power connector, and stops the supply of the operation power to the main control module.

* * * * *